(12) United States Patent
Beuch et al.

(10) Patent No.: US 6,274,844 B1
(45) Date of Patent: Aug. 14, 2001

(54) LASER WELD DISK CARTRIDGE

(75) Inventors: Donald Beuch, Midvale; Ronald F. Hales, Roy, both of UT (US); Brian Schick, San Diego, CA (US); Carl Thomas Gucker, Brandon (GB); Michael William Nordmeyer, Neshanic Station, NJ (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/350,565

(22) Filed: Jul. 9, 1999

Related U.S. Application Data

(63) Continuation of application No. 08/968,362, filed on Nov. 12, 1997, now Pat. No. 5,951,890.

(51) Int. Cl.$^7$ .......................... B23K 26/22; B23K 15/00; G11B 23/03
(52) U.S. Cl. ................. 219/121.64; 219/121.14; 360/133; 369/291
(58) Field of Search .......... 219/121.63, 121.64, 219/121.13, 121.14, 121.77; 360/133; 369/291

(56) References Cited

U.S. PATENT DOCUMENTS

| | | | | |
|---|---|---|---|---|
| 4,471,397 | * | 9/1984 | Cloutier .................. | 360/133 |
| 4,652,961 | * | 3/1987 | Dieffenbach ............ | 360/133 |
| 4,970,618 | * | 11/1990 | Kato et al. ............... | 360/133 |
| 5,064,992 | * | 11/1991 | Jones et al. ............. | 219/121.63 |
| 5,369,242 | * | 11/1994 | Hatfield et al. .......... | 219/121.63 |
| 5,585,988 | * | 12/1996 | Kutsukake et al. ...... | 360/132 |
| 5,616,261 | * | 4/1997 | Forrest ..................... | 219/121.63 |
| 5,861,602 | * | 1/1999 | Cox et al. ................ | 219/121.64 |
| 5,920,450 | * | 7/1999 | Fujiwara et al. ......... | 360/133 |
| 5,951,890 | * | 9/1999 | Beuch et al. ............. | 219/121.64 |
| 6,078,482 | * | 6/2000 | Clark et al. .............. | 360/133 |
| 6,133,544 | * | 10/2000 | Beuch et al. ............. | 219/121.64 |

FOREIGN PATENT DOCUMENTS

| | | | | |
|---|---|---|---|---|
| 747901 A1 | * | 12/1996 | (EP) . | |
| 756444 A3 | * | 11/1997 | (EP) . | |
| 56-105372 | * | 8/1981 | (JP) . | |
| 3-210986 | * | 9/1991 | (JP) ................ | 219/121.63 |
| 7-334963 | * | 12/1995 | (JP) . | |

* cited by examiner

*Primary Examiner*—Geoffrey S. Evans
(74) *Attorney, Agent, or Firm*—Woodcock Washburn Kurtz Mackiewicz & Norris LLP

(57) ABSTRACT

A process for assembling a disk cartridge is disclosed. The process includes the steps of snapping a top shell half of the disk cartridge over a bottom shell half of the disk cartridge; adjusting the shell halves until the shell halves are in abutment contact with each other at a weld site; and directing an energy beam at the weld site until a portion of the top shell half and a portion of the bottom shell half fuse so that the top shell half is fixed to the bottom shell half. The process is repeated for each of a plurality of weld sites located on the perimeter of the disk cartridge. A process for assembling a disk cartridge is disclosed in which an energy beam is split into a plurality of split energy beams. The plurality of split energy beams are focused on a plurality of weld sites until a portion of the top shell half and a portion of the bottom shell half fuse so that the top shell half is fixed to the bottom shell half. A disk cartridge prepared by either of the above described processes is also disclosed.

14 Claims, 5 Drawing Sheets

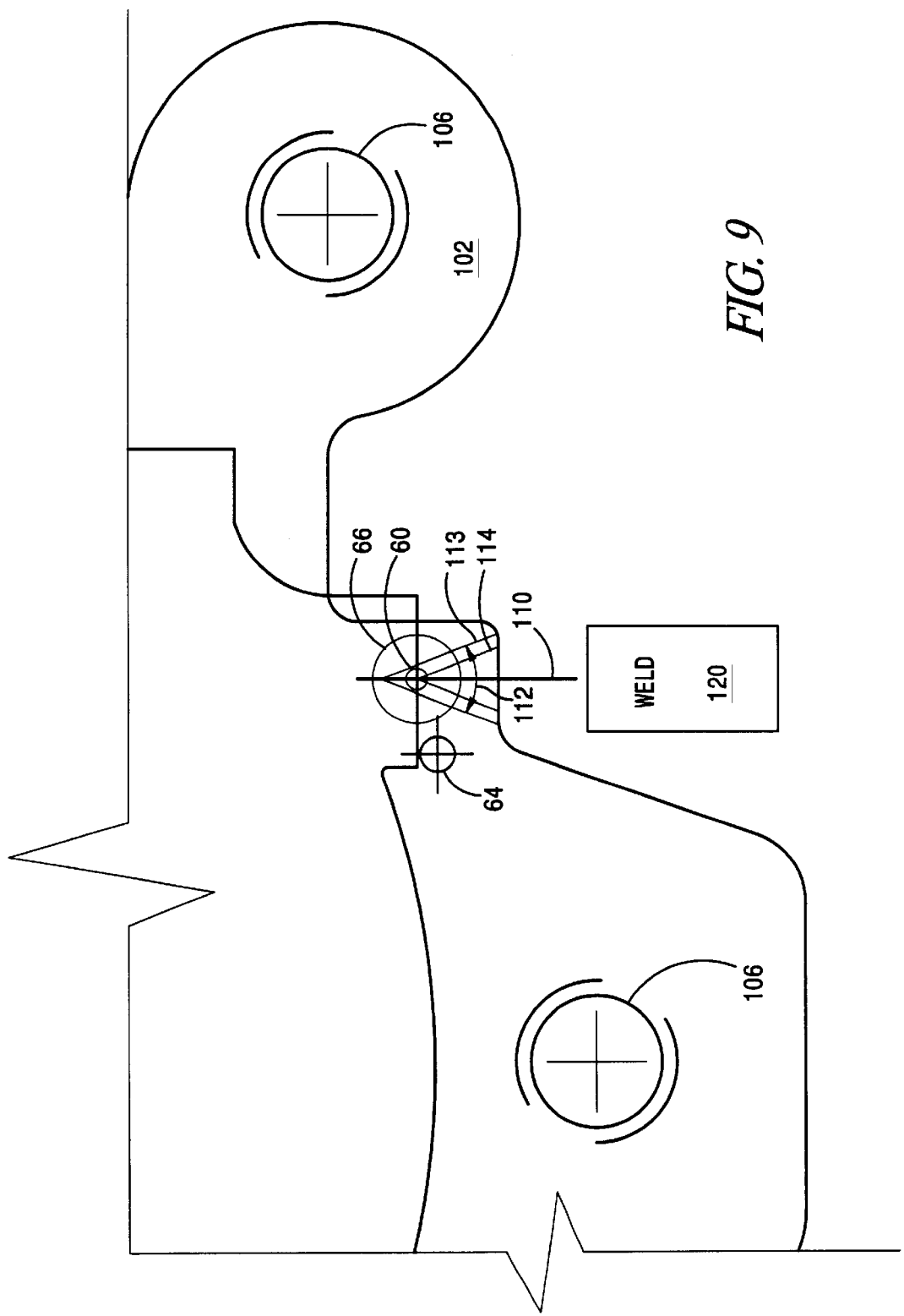

LASER WELD DISK CARTRIDGE

CROSS REFERENCE TO RELATED APPLICATIONS

This Application: is a continuation of U.S. provisional Application Ser. No. 08/968/362 filed Nov. 12 1997, now U.S. Pat. No. 5,951,890.

BACKGROUND OF THE INVENTION

This invention relates to assembly techniques for storage systems. More particularly, the invention relates to a welding process for the assembly of disk cartridges.

Disk based data storage devices for storing digital electronic information have been in use in the computer industry for several decades. The storage devices operate by storing digital information on magnetic disk media, which can be either rigid or flexible and are mounted on a rotating hub. These storage devices are commonly referred to as disk drives. Disk drives come in two varieties: removable media and fixed media drives.

Removable media drives accept the disk media in the form of a removable disk cartridge. When the disk cartridge is inserted into a disk drive, a spindle motor in the drive couples with the disk hub in order to rotate the disk within the cartridge at a given speed. In fixed media drives, by contrast, the disk hub is permanently attached to the spindle motor. Disk drives typically employ either a linear actuator mechanism or a rotary actuator mechanism. The actuator positions the read/write head(s) of the disk drive on the recording surface(s) of the disk.

The general technological trend is one of shrinking component sizes. This trend also applies to the disk drive industry. For example, 2" inch disk drives (and smaller) are becoming prevalent. Correspondingly, disk cartridges, and the tolerances required in manufacturing them, are shrinking as well. In such disk cartridges, the relative placement of components becomes a key technical issue. For example, to ensure proper operation of the disk cartridge, as well as to ensure portability of the disk cartridge from one disk drive to another, the spatial dimensions of the cartridge, such as its thickness, must be controlled precisely. Traditionally, disk cartridge components were assembled by screwing or gluing components together. However, where the coplanarity and dimensional relationship of the components is critical, this traditional method provides insufficient precision. Additionally, the screws or glue used to assemble the components takes up space in the cartridge. As cartridges become smaller, less space in the cartridge can be budgeted for the assembling mechanisms.

Traditional welding techniques of metal components use lap joints or butt joint of metallic components. However, where the dimensional tolerances are critical the lap joint and butt joint methods may be untenable. If lap joint methods were used in such critical applications, such as the assembly of disk cartridges, small variations in component tolerances, such as bends and burrs in the metal components that occur during stamping, may be enough to cause tolerance problems in the finished disk cartridge. The dimensional tolerance problems would eventually prevent further technological advances that might be achieved due to further reductions in the size of disk cartridges. Moreover, to account for the component tolerance variations, the components themselves would have to meet extreme tolerances. As a result of the extreme component tolerances that would be necessary, the increased component cost would ultimately increase disk cartridge cost.

The extreme component tolerances and higher disk cartridge costs could be circumvented by an improved assembly process. Thus there is a need for an improved, economical assembly process of disk cartridges that insures consistency in the dimensional relationships among components.

SUMMARY OF THE INVENTION

The present invention meets the above need by providing a process for assembling a disk cartridge. The process comprises the steps of snapping a top shell half of the disk cartridge over a bottom shell half of the disk cartridge; adjusting the top shell half and the bottom shell half until the top shell half and the bottom shell half are in abutment contact with each other at a weld site; and directing an energy beam at the weld site until a portion of the top shell half and a portion of the bottom shell half fuse so that the top shell half is fixed to the bottom shell half.

In a preferred embodiment in which a plurality of weld sites are used, the process of the present invention comprises the additional steps of adjusting the top shell half and the bottom shell half until the top shell half and the bottom shell half are in abutment contact at a second weld site; and directing an energy beam at the second weld site until a portion of the top shell half and a portion of the bottom shell half fuse at the second weld site.

In a preferred embodiment of the present invention, at least one of the shell halves has a tab and the shell half having the tab is adjusted until the tab and the other shell half are in abutment contact with each other at the weld site. The welding process is accomplished by use of a welding fixture in which set screws and spring loaded plungers are employed to ensure that the shell halves are in abutment contact with each other and that the disk cartridge has the desired thickness.

In another preferred embodiment, an energy beam (for example, a laser beam) is split into a plurality of split energy beams. The plurality of split energy beams are focused on a plurality of weld sites until a portion of the top shell half and a portion of the bottom shell half fuse so that the top shell half is fixed to the bottom shell half at the plurality of weld sites.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 9 is a detailed top view of a weld site on a disk cartridge.

DETAILED DESCRIPTION OF THE PREFERRED EMBODIMENTS

The present invention provides a process for assembling components in three dimensional space using a welding process. Throughout the description, a preferred embodiment of the invention is described in connection with the assembly of disk cartridge components. However, the components shown only illustrate the operation of the present invention and are not intended as limitations. Accordingly, the invention should not be limited to the embodiment shown.

Figure 1:
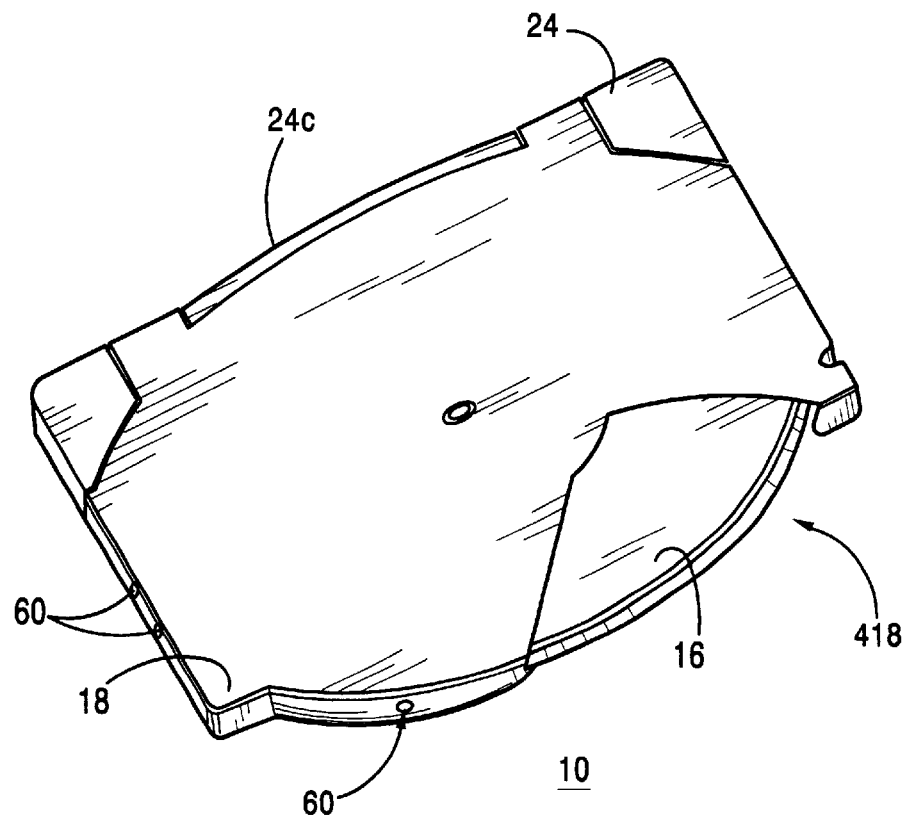
FIG. 1 is an isometric view of a miniature disk cartridge.
Figure 4:
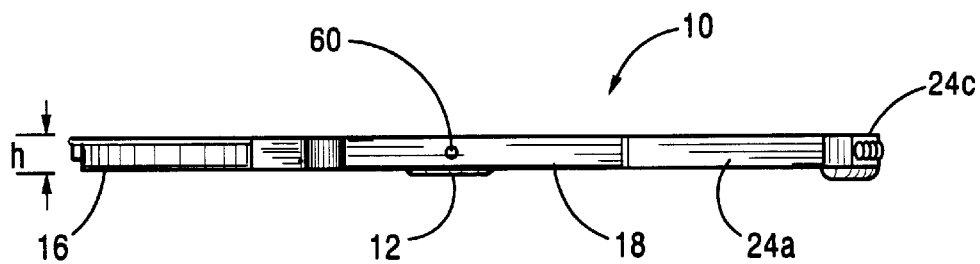
FIG. 4 is a side elevation view of a miniature disk cartridge.
Figure 2:
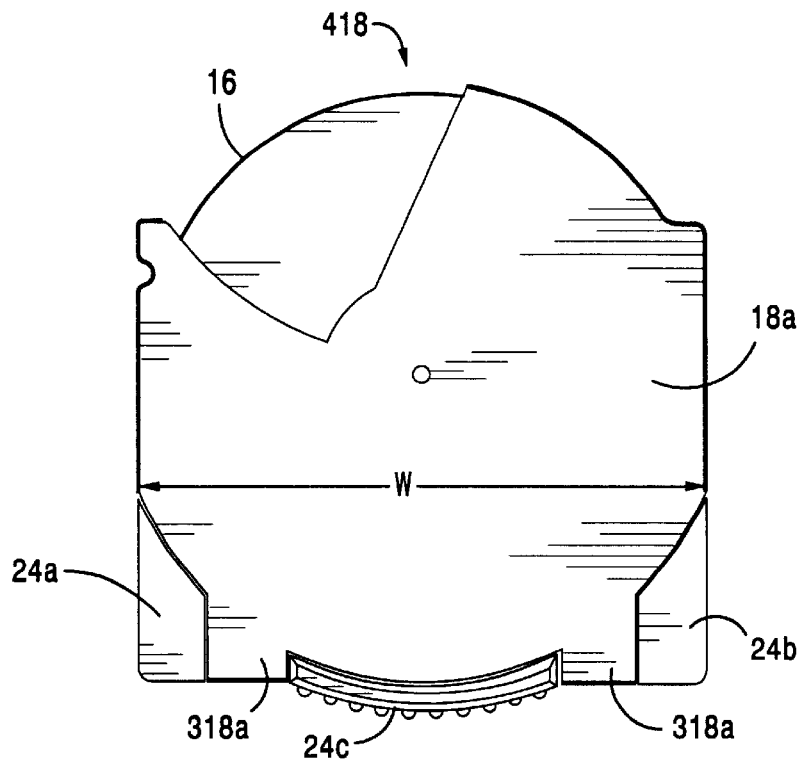
FIG. 2 is a top plan view of a miniature disk cartridge.
Figure 3:
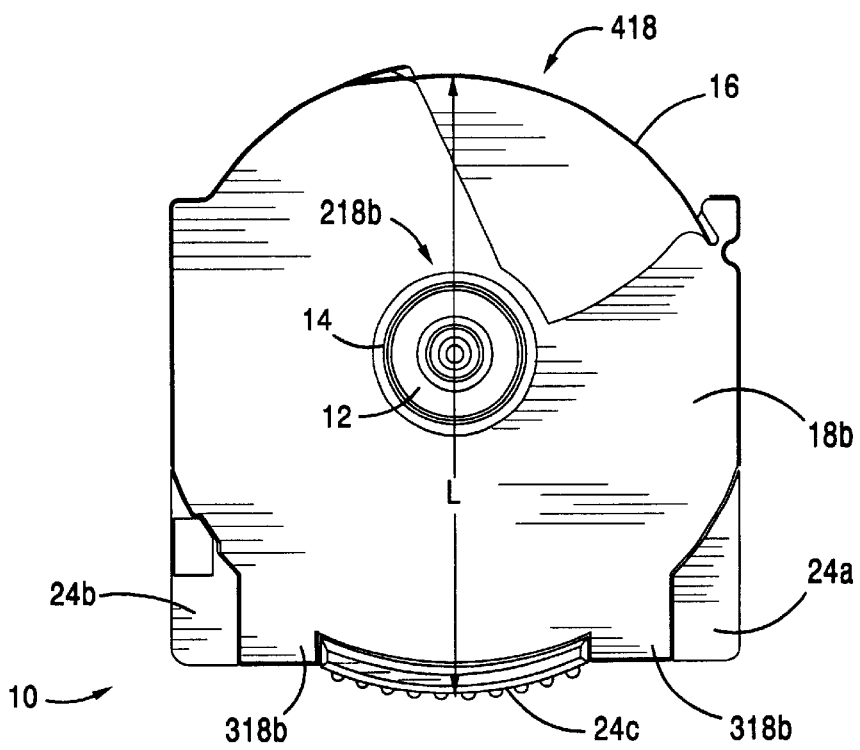
FIG. 3 is a bottom plan view of a miniature disk cartridge.

FIGS. 1–4 are isometric, top plan, bottom plan, and side elevation views, respectively, of a miniature disk cartridge 10 that embodies aspects of the present invention. Miniature disk cartridge 10 has a number of differences from a full-size cartridge (such as the well-known 1.44 megabyte 3.5" floppy disk cartridge and the well-known ZIP disk cartridge) that prevent the miniature disk cartridge 10 from operating directly in a full-size drive. Perhaps, the most obvious of these differences is size. Disk cartridge 10 has a much smaller form factor than a full-size drive cartridge. Whereas a full size drive cartridge is about 4" square and ¼" high, a miniature disk cartridge 10 is less than about 2" square and about 1/10" high. In particular, disk cartridge 10 has a width, w, preferably in a range of about 49 mm (1.9") to 51 mm (2"), most preferably about 50.1 mm; a length, 1, of about 50 to 52.5 mm long, preferably about 51.8 mm; and a thickness, h, of less than about 2 mm (about 1/10") thick, most preferably 1.95 mm. A large wedged shaped disk access opening 418 is disposed in the front portion of disk cartridge 10 to provide selective access to the media of cartridge 10. Disk cartridge 10 comprises a flexible magnetic disk 14 (partially shown in FIG. 3) and a disk media hub 12. A driving access hole 218b provides an opening in cartridge 10 for rotating disk 14. Hub 12 is sized slightly smaller than driving hole 218b, and as best shown in FIG. 4, hub 12 projects downwardly from cartridge 10.

Figure 5:
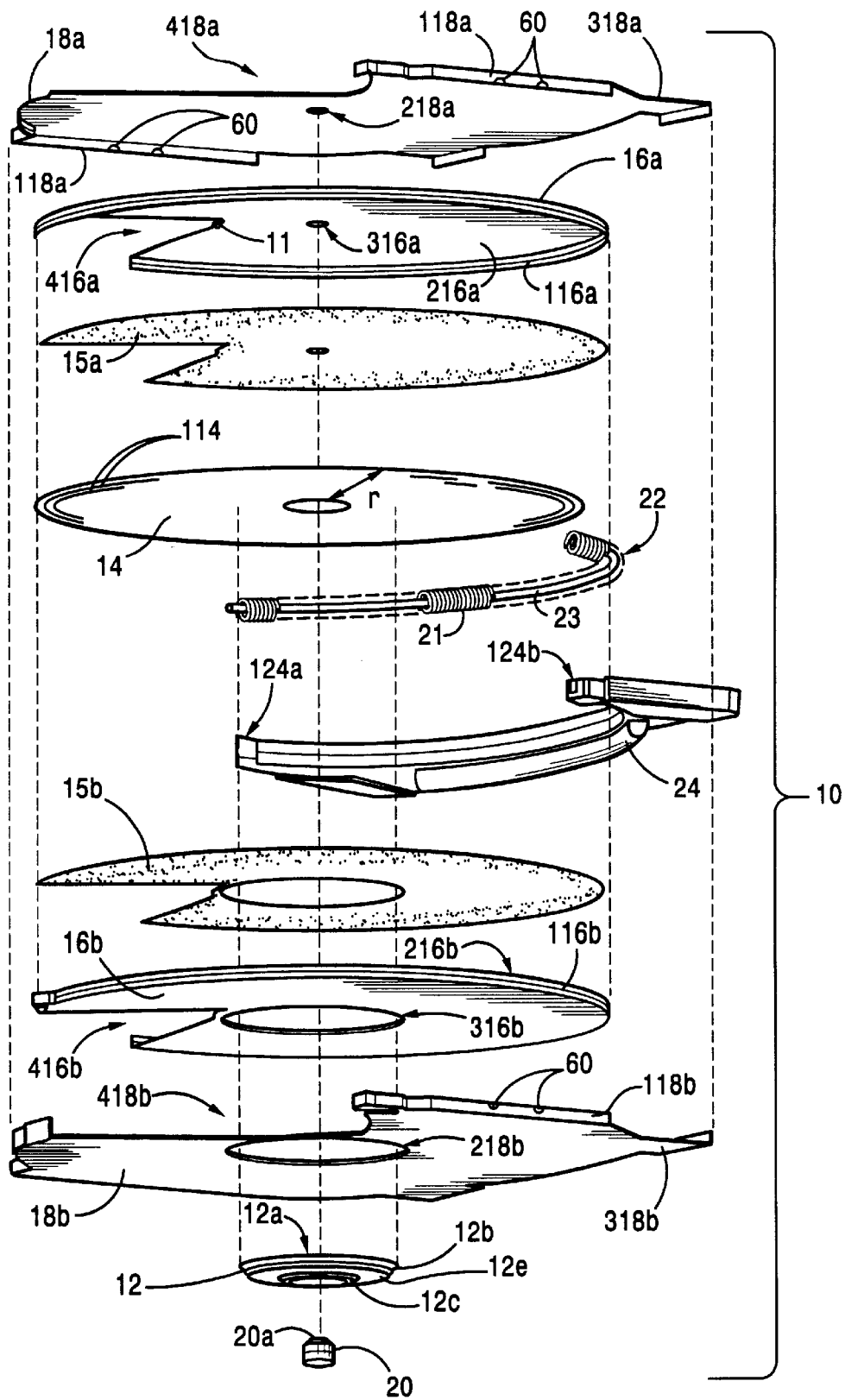
FIG. 5 is an exploded view of a miniature disk cartridge.

Referring also to FIG. 5, an exploded view of cartridge 10 is provided to more clearly show cartridge 10 interior components. Cartridge 10 comprises top and bottom cartridge shell halves 18a and 18b, respectively, a rotary shutter shell having upper and lower halves 16a and 16b, respectively, upper and lower shutter shell liners 15a and 15b, respectively, a shutter pivot post 20, a shutter spring mechanism 22, and a shell stabilizer 24.

Cartridge 10 is less than about half the thickness of the well-known 3.5 inch floppy disk. As a result, conventional removable cartridge shell materials cannot be used to construct cartridge 10. Plastics, such as those used in the well-known 3.5 inch floppy disk, would either be too thick or not strong enough if manufactured with the desired thickness. To manufacture a thin cartridge, such as cartridge 10, all of the component materials must be as thin as possible while providing structural support that will withstand the rigors of everyday use. For example, cartridge shell halves 18a and 18b are formed from a thin sheet material preferably about 0.1854 mm thick. To provide the structural support, the shell is preferably made from a sheet metal. Preferably the metal is sheet steel, more preferably stainless steel, and most preferably series 300 stainless steel. Cartridge shell halves 18a and 18b are preferably cut from a sheet of steel in a stamping operation which forms the turned edge portions 118a and 118b, provides the cutouts such as the driving hole 218b in the bottom cartridge shell half 18b, post hole 218a in the top cartridge shell half 18a, media access openings 418a, 418b, and so on.

Shutter shell halves also must meet strict thickness requirements. As such, shutter shell 16a and 16b are formed from a thin sheet material. The sheet material is preferably a sheet metal. The sheet metal is preferably thin sheet aluminum, preferably 5052 aluminum, more preferably in a half-hard condition. The sheet aluminum is preferably about 0.1854 mm thick. Shutter shell halves are also preferably cut from a sheet of aluminum in a stamping operation which forms upstanding rim 116a in top shutter shell half 16a, upstanding rim 116b in the bottom shutter shell half 16b, and cuts driving hole 316b in the bottom of shutter shell half 16b, pivot hole 316a in the top shutter shell half 16a, and media access openings 416a, 416b in shutter shell halves 16a and 16b.

Liners 15a and 15b are attached to shutter shell halves 16a and 16b. Liner 15a is attached to inside surface 216a of shutter shell half 16a; whereas liner 15b is attached to inside surface 216b of shutter shell half 16b. Disk media 14 rotates within the shutter shell 16 and not the cartridge shell 18. Accordingly, unlike other known cartridges wherein the liners are typically attached to the inside of the cartridge shell, liners 15a, 15b are attached to the inside surface of shutter shells 16a, 16b. Liners 15a and 15b are preferably attached via an adhesive, more preferably a pressure sensitive adhesive. Liners 15a and 15b are cut to the shape of the surface to which they will be attached (i.e., 216a, 216b) from a sheet of liner material. The liner material is preferably 100% polyester.

Stabilizer 24 is a substantially U-shaped spacer positioned in the rear portion of cartridge 10 and between upper and lower cartridge shell halves 18a and 18b. Rear cartridge shell tabs 318a and 318b extend rearwardly from upper and lower shell halves 18a and 18b and wrap around stabilizer 24. Therefore, when cartridge 10 is assembled, a portion of stabilizer 24 extends into and between the shell halves 18a and 18b and portions of stabilizer 24 protrude from joined upper and lower shell halves 18a and 18b. The protruding portions of stabilizer 24 form portions of the outer contours of cartridge 10. In particular, stabilizer 24 forms cartridge rear corners 24a and 24b and forms rear portion 24c.

Stabilizer 24 is formed of a lightweight rigid material such as plastic. More preferably, stabilizer 24 is formed of high impact polystyrene. It is formed from any one of the well-known plastic forming processes, such as injection molding. Stabilizer 24 provides dimensional stability and rigidity to cartridge 10, thereby minimizing cartridge deformation during mishandling, twisting, and so on.

Shutter spring mechanism 22 comprises a guide wire 23 and a round helical compression spring 21 that is slid over guidewire 23. Shutter spring mechanism 22 is fixed to stabilizer 24 at the ends of guide wire 23. The ends seat in channels 124a and 124b that are formed into the ends of U-shaped stabilizer 24. The operational details of shutter spring mechanism 24 are described in further detail below in connection with the description of cartridge opening and closing.

Flexible magnetic disk 14 is formed of a thin polymer film, such as MYLAR, and has a thin magnetic layer uniformly dispersed on the top and bottom surfaces thereof. The magnetic layer makes the flexible disk 14 susceptible to magnetic flux and enables the storage of digital data when the disk surface is brought into magnetic communication with a magnetic transducer of the type commonly found in disk drives. Disk 14 is generally circular with a circular hole proximate the center of disk 14. Disk 14 has a radius, r, in a range of about 20 to 25 mm, and preferably about 23.25 mm. Disk 114 has concentric tracks 114 that provide the formatting of disk 14 to store digital information.

Hub 12 comprises a substantially flat bottom surface 12e, and an inner ring 12c, and outer peripheral edge 12b. Inner ring 12b has an outer angled edge and a substantially flat bottom surface. Outer peripheral edge 12b is also angled. Media hub 12 is firmly secured to disk 14 such that the center of hub 12 is aligned proximate the center of disk 14. Media hub 12 is preferably attached to disk 14 via a well-known adhesive process. The disk and hub assembly are rotatably disposed between upper and lower cartridge shutter shell halves 16a, 16b. Hub 12 is disposed in spindle access hole 316b of lower shutter shell 16b and spindle access hole 218b of lower cartridge shell 18b. The protrusion of hub 12 from shutter shell 16 and an cartridge shell 18 enhances coupling to a rotational power source, such as that provided by a drive spindle.

Cartridge 10 is assembled according to the following overall general steps. Hub 12 and disk 14 are attached by a gluing process, such as hot melt adhesion. Liners 15a and 15b are attached to shutter shells 16a and 16b, respectively. Upper shutter shell 16a is attached to upper cartridge shell 18a via post 20. Spring 21 and guidewire 23 are attached to stabilizer 24. The stabilizer subassembly is then placed in lower cartridge shell 18b. Lower shutter shell 16b is placed in lower cartridge shell 18b. Hub 12 and disk 14 assembly are placed in lower shutter shell 16b. Upper cartridge shell 18a and upper shutter shell 16a subassembly are snapped over the lower cartridge shell assembly. As a result, upper and lower shutter shells 16a, 16b snap together along side walls 116a and 116b, respectively. The entire cartridge assembly is then placed in fixture 100.

Figure 6:
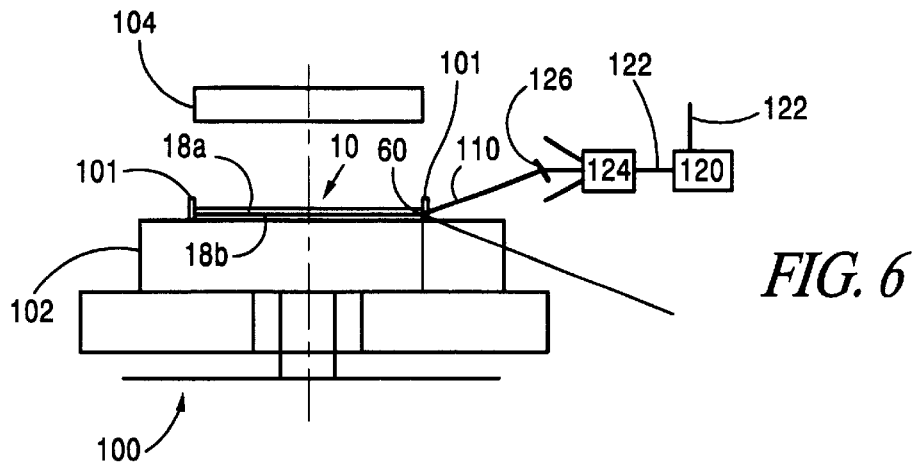
FIG. 6 is a side elevation view of a welding fixture base holding a disk cartridge.

Cartridge 10 is then fixed together by welding top shell half 18a and bottom shell half 18b at a plurality of weld sites 60. Preferably, this is accomplished by using a welding fixture 100. FIG. 6 shows a side view of cartridge 10 set in welding fixture 100. The cartridge components shown in FIG. 5 are placed in welding fixture bottom 102. Guide pins 101 ensure that cartridge 10 is aligned properly in fixture bottom 102. Fixture top 104 is then clamped onto fixture bottom 102. Thus, cartridge 10 is squeezed between fixture top 104 and fixture bottom 102. A plurality of weld sites 60 are identified at various points on the perimeter of cartridge 10.

An energy beam 110 of about 50–100 watts, preferably about 63 watts, with a percent power of about 10–16 percent, preferably about 14 percent, is directed at each weld site 60 for about 2–6 ms, preferably for about 3 ms. In a preferred embodiment, a single energy source 120 is used to provide the required energy beams 110. In a preferred embodiment, energy source 120 is an AURORA P10 convergent energy 500 watt neodidium YAG (ND:YAG) laser manufactured by TRANS-CON CONVERGENT ENERGY. An energy beam 122 from energy source 120 is split using beam splitters 124 into as many energy beams 110 as there are weld sites 60. Each energy beam 110 is focused on a weld site 60 at a focus angle 112 using a fiber optic focus pad 126. Each energy beam 110 causes top shell half 18a and bottom shell half 18b to fuse at a weld site 60 to which the energy beam 110 is directed. Thus, top shell half 18a is fused to bottom shell half 18b at all weld sites 60 simultaneously.

It will be appreciated that cartridge 10 may be assembled by fusing each of the weld sites 60 one at a time. In this embodiment, fixture bottom 102 is rotated until a weld site 60 is aligned with energy source 120. Energy beam 122 from energy source 120 is directed at a weld site 60, fusing top shell half 18a and bottom shell half 18b at that weld site 60. Fixture bottom 102 is rotated again until the next weld site 60 is aligned with energy source 120. The process is repeated until all weld sites 60 have been fused.

Figure 7:
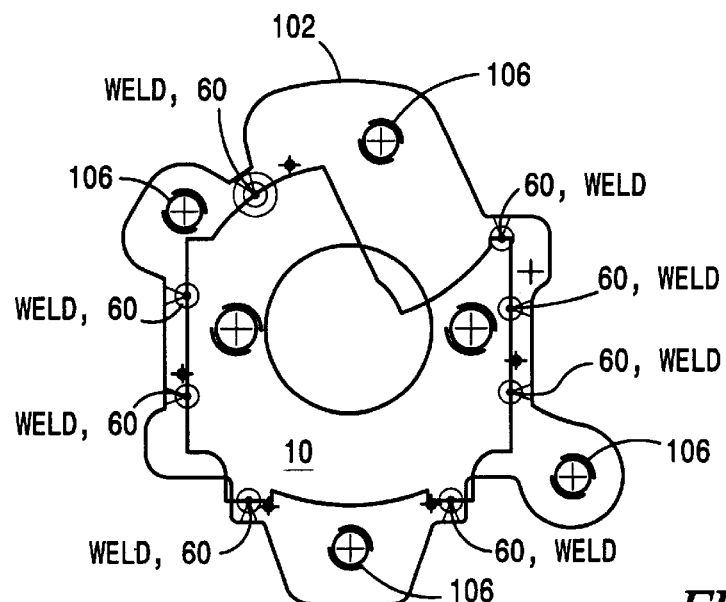
FIG. 7 is a top plan view of a welding fixture base holding a disk cartridge.

FIG. 7 shows a top plan view of cartridge 10 set in welding fixture bottom 102. Clamping screws 106 are used to clamp fixture top 104 to fixture bottom 102. Preferably, clamping screws 106 are ¼–20 UNC. Weld sites 60 are shown at various locations around the perimeter of cartridge 10. In a preferred embodiment, eight weld sites are used. However, it should be understood that the actual number of weld sites 60 may vary.

Figure 8:
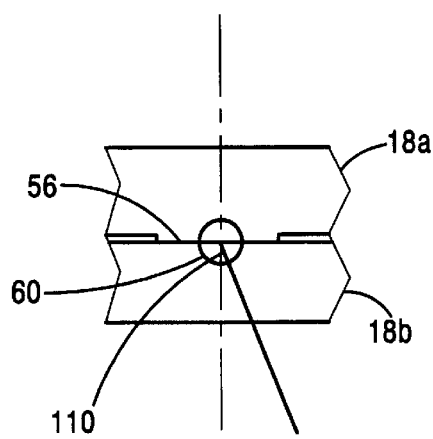
FIG. 8 is a detailed side elevation view of a weld site on a disk cartridge.

FIG. 8 is a detailed side view of a weld site 60. As shown in FIG. 8, at each weld site 60, top shell half 18a has an extension or tab 56. In a preferred embodiment, tab 56 is about 0.002–0.005 inches high, preferably 0.003 inches high, by about 0.050–0.070 inches wide, preferably about 0.050 inches wide. Set screw 64 is located near weld site 60 and adjusted until tab 56 is in abutment contact with bottom shell half 18b.

According to the process of the present invention, energy beam 110 is directed at weld site 60 causing a portion of tab 56 and a corresponding portion of lower shell half 18b to melt, thus fusing together top shell half 18a and bottom shell half 18b to form disk cartridge 10. In a preferred embodiment, weld site 60 is substantially circular and is about 0.020–0.030 inches in diameter, preferably about 0.020 inches in diameter.

FIG. 9 is a detailed top view of a typical weld site 60. As shown in FIG. 9, set screw 64 is located near weld site 60. Set screw 64 is adjusted to ensure that top shell half 18a makes contact with bottom shell half 18b at weld site 60. This is important since, if top shell half 18a is not in abutment contact with bottom shell half 18b at each weld site 60, a faulty weld or damage to cartridge 10 may occur during assembly. Preferably, set screw 64 is ground to the height, h, of cartridge 10. To insure the height of cartridge 10 against variations in the components, a spring loaded plunger 66 is used to apply a small amount of spring load at each weld site 60. Preferably, there is a spring loaded plunger 66 in fixture top 104 and fixture bottom 102, substantially perpendicular to cartridge 10 such that a spring load is applied at weld site 60 from both top and bottom. Preferably, spring loaded plunger 66 is a CARLANE No. 6 spring loaded ball plunger.

Energy beam 110 is directed at a focus angle 112 from energy source 120 toward weld site 60. Preferably, focus angle 112 is between about 30° and 40°, more preferably about 35°. Two cones, outer cone 113 and inner cone 114, are milled into fixtures 102, 104 proximate weld site 60. Outer cone 113 is milled deeper than inner cone 114 to provide enough clearance to prevent melting of fixture 100.

The above description of preferred embodiments is not intended to impliedly limit the scope of protection of the following claims. For example, while a preferred embodiment of the process of the present invention has been described wherein energy beams, such as laser beams, are used to weld the cartridge, those skilled in the art will appreciate that other welding techniques, such as resistance welding, may also be used without departing from the principles of the claimed invention.

What is claimed is:

1. disk cartridge comprising:

an outer shell comprising first and second metallic shell halves brought into abutment contact and having at least one tab formed in one of the first and second shell halves proximate the positions where the first and second shell halves come into abutment contact;

a weld location along an outer peripheral edge of said outer shell proximate a location where the first and second shell halves meet, said weld location fixing said first and second shell halves together; and a recording medium rotatably disposed within said outer shell.

2. The disk cartridge as recited in claim 1 wherein said weld comprises a laser weld.

3. The disk cartridge as recited in claim 1 wherein said recording medium comprises a magnetic medium.

4. The disk cartridge as recited in claim 1 wherein said cartridge comprises a thickness of about 2 mm.

5. The disk cartridge as recited in claim 1 wherein said cartridge comprises a width of about 49 mm to about 51 mm.

6. The cartridge as recited in claim 1 wherein said cartridge comprises a stabilizer disposed between said first and second metallic shell halves.

7. The cartridge as recited in claim 1 wherein at least one of said first and second metallic shell halves comprises a tab at said weld location.

8. A disk cartridge formed according to a process comprising:

positioning a first shell half into abutment with a second shell half along a peripheral edge of said first shell half and and a peripheral edge of said second shell half and having at least one tab formed in one of the first and second shell halves proximate the positions where the first and second shell halves come into abutment;

disposing a storage medium between said first shell half and second shell half; and applying energy to said first and second shell halves proximate said at least on tab wherein the first shell half abuts the second shell half, said energy forming a weld location to join said first and second shell halves together.

9. The disk cartridge as recited in claim 8 wherein said energy comprises laser energy.

10. The disk cartridge as recited in claim 8 wherein said first and second shell half comprise a metallic material.

11. The disk cartridge as recited in claim 8 wherein at least one of said first shell half and said second shell half comprises a tab at the point wherein said first shell half and said second shell half abut.

12. A process for assembling a disk cartridge, the process comprising:

positioning a first and second shell half into abutment contact with a data storage medium disposed between said first and second shell halves with at least one tab formed in one of the first and second shell halves proximate the positions where the first and second shell halves come into abutment contact; and directing a plurality of energy beams at a plurality of locations proximate positions where said first and second shell halves come into abutment contact, whereby said first and second shell halves are welded together.

13. The process as recited in claim 12 wherein energy beams comprise a laser beam.

14. The process as recited in claim 12 wherein the data storage medium comprises a magnetic medium.

* * * * *